Aug. 25, 1970   E. H. FILIPAK   3,525,852

BI-LEVEL COOKING PLATFORM

Filed May 22, 1968

United States Patent Office 3,525,852
Patented Aug. 25, 1970

3,525,852
BI-LEVEL COOKING PLATFORM
Edmund H. Filipak, Lexington, Ohio, assignor to Westinghouse Electric Corporation, Pittsburgh, Pa., a corporation of Pennsylvania
Filed May 22, 1968, Ser. No. 731,247
Int. Cl. H05b 3/68
U.S. Cl. 219—444                                6 Claims

ABSTRACT OF THE DISCLOSURE

Domestic electric cooking platform having bi-level surface heating units in which the space located between the two levels contains an auxiliary heating device which may be extended from this space to an operating position over the lower level.

BACKGROUND OF THE INVENTION

Field of the invention

This invention relates to cooking platforms of the bi-level (i.e., terrace) type.

Description of the prior art

The known terrace type cooking platforms have proven quite successful due to the added convenience of having a work surface at two different heights. Usually a space is left between the surface heating units on the front, lower level of the platform to provide a working surface for the housewife for food preparation and other purposes incidental to cooking. However, there may also be instances in which it would be desirable to use this space to accommodate a surface unit or other heating device, and it is therefore the general object of this invention to provide an arrangement which more effectively utilizes the working space of a terrace type cooking platform.

SUMMARY OF THE INVENTION

According to this invention an auxiliary heating unit is provided in a storage space between the two working levels and is arranged to be moved out to an operable position overlying the front, lower level. Means are also provided to prevent energization of the auxiliary unit in its stored position.

DRAWING DESCRIPTION

PREFERRED EMBODIMENT

Figure 1:
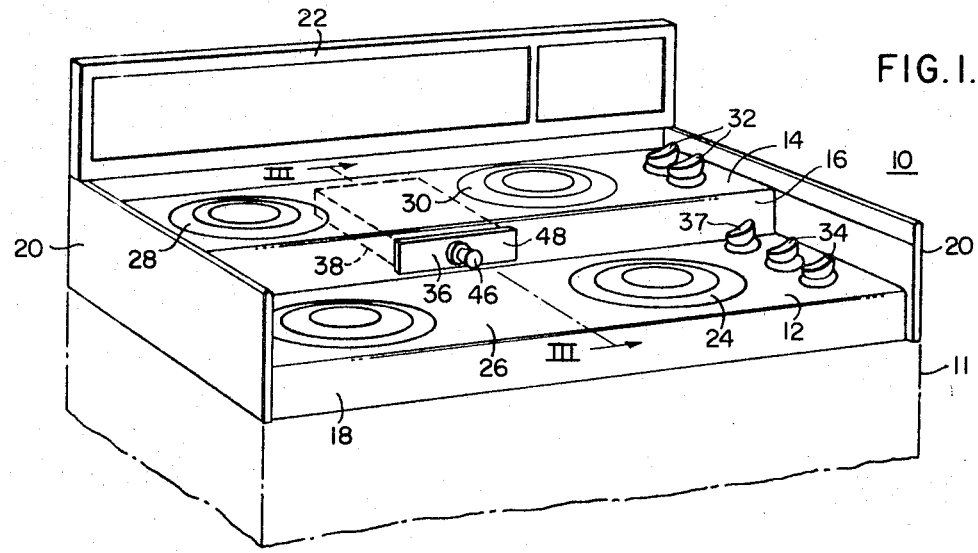
FIG. 1 is a fragmentary perspective view of a cooking platform embodying the invention, with the auxiliary heating unit shown in the retracted position.
Figure 2:
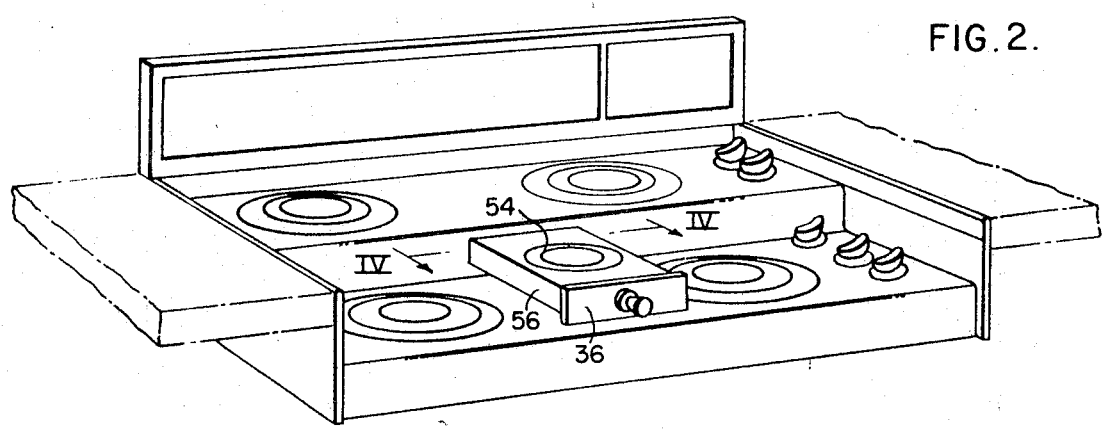
FIG. 2 is a fragmentary perspective view of the platform of FIG. 1 but with the auxiliary unit shown extended to its operable position.

The cooking platform 10 shown in FIGS. 1 and 2 may serve as the top of an electric range 11 with oven or, alternatively, may be an independent unit built into a kitchen counter top. The platform has a front, lower terrace or level 12, and a rear, upper terrace 14 separated by the intermediate wall 16 which, in the illustration, is vertically disposed. Another vertical wall 18 adjoins the lower terrace 12 to form the front face of the platform. Terraces 12 and 14 and vertical faces 16 and 18 may be formed from one continuous piece of sheet metal bent in the form shown in FIGS. 1 and 2. Side splash panels 20 are secured to the side edges of the top by any suitable means, and an upright back panel 22 extends along the rear of the platform.

The lower terrace will normally support two surface heating units 23 and 24 which may be of conventional character. These heating units are spaced sufficiently far apart to provide for a free working area 26 on the lower terrace. It will be appreciated however that the lower terrace may have only one surface unit, or in other cases may have no surface units and take the form of a wooden working board. Usually two additional surface units 28 and 30 of the same type and construction as the front heating units are located on the upper terrace 14 in spaced apart relation. Temperature control knobs 32 for units 28 and 30, and temperature control knobs 34 for units 22 and 24 and any oven control knobs (not shown) are located near the right side edges of terraces 14 and 12, respectively.

Figure 3:
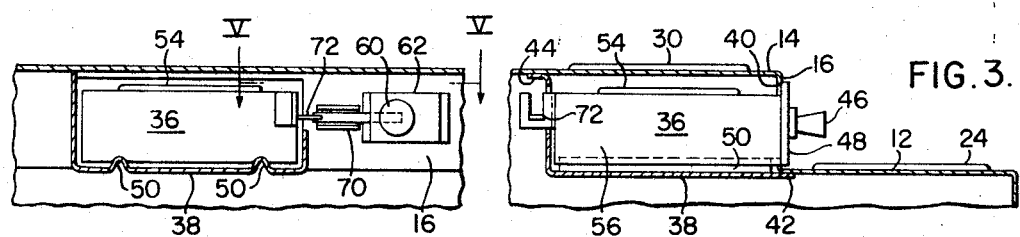
FIG. 3 is a vertical sectional view corresponding to one taken on the line III—III of FIG. 1.

It will be apparent that an unoccupied space is available below the level of the upper terrace 14 (FIGS. 1 and 2) and between the surface units 28 and 30 in the conventional terrace top cooking platform. In accordance with the invention, this space is utilized to store an auxiliary heating device designated generally as 36. When the auxiliary device is not in use it is supported in the storage space 38 indicated by broken lines in FIG. 1. The structure defining the storage space may be seen in FIGS. 3 and 4. As there shown the storage space may include a generally box-shaped housing (also 38) constructed of any suitable material such as sheet metal. An opening 40 in the vertical wall 16 between levels 14 and 12 of the range top is provided to allow the auxiliary device to be pulled forwardly to its extended position for use. The lower front edge of the housing is attached along the lower surface of the lower level 12 at 42 by any suitable means. Similarly, the upper edge of the housing is secured to the lower surface of the upper level 14 at 44.

A handle 46 is attached to the front cover 48 of the auxiliary device 36 and suitable embossed tracks 50 (FIG. 4) are also provided along the bottom 52 of the housing 38 to guide the movement of the device between its stored and extended positions. When not in use at least the major portion of the auxiliary device is stored in its retracted position within the storage space under the central portion of the upper terrace 14 as shown in FIG. 1. This leaves the central portion of the lower terrace 12 free for other uses. When it is desired to use the auxiliary device is is pulled forwardly by means of the handle 46 to its extended operable position to overlie the area 26 of the lower level 12.

Figures 4, 5:
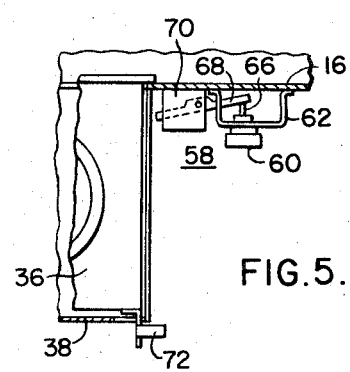
FIG. 4 is a vertical sectional view corresponding to one taken on the line IV—IV of FIG. 2.
FIG. 5 is a horizontal sectional view corresponding to one taken on the line V—V of FIG. 4 showing the interlock switch in the "off" position preventing energization of the auxiliary heating device; and, FIG. 6 is a horizontal sectional view similar to that of FIG. 5, but showing the switch in the "on" position to permit energization of the heating device.
Figure 6:
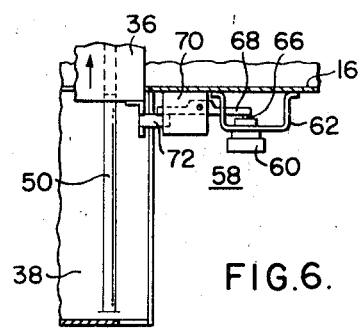

The auxiliary device 36 is preferably manually controlled by a control switch 37 (FIG. 1) which may conveniently be located adjacent the surface unit switches 32 and 34 as illustrated, or alternatively may be mounted on the device itself, as for example on the front cover 48. In the preferred embodiment of this invention, the auxiliary device may not be energized by its control switch 37 until it is extended to its operating position, and will automatically be deenergized when it is moved into its stored position, thus preventing the dangerous situation of storing the auxiliary device while still energized. My preferred way of accomplishing this is by providing a safety (i.e., interlock) switch in series with the control switch 37. One safety switch arrangement for accomplishing this is shown in FIGS. 4–6, and utilizes a device 58 of the character described in U.S. Pat. No. 3,291,967, issued to Carl W. Tilus, and assigned to the assignee of the present invention. A safety switch 60 is mounted on bracket 62 which in turn is mounted by any suitable mounting means to the interior surface of vertical wall 16. The safety switch has a plunger 66, which is internally biased to an extended position (FIG. 5) in which the switch is open, and which is actuated to a FIG. 6 position in which the switch is closed by rotation of a pivotal member 68 which is mounted on the vertical wall 16 by a bracket 70. A tab 72 is disposed on the rear of the auxiliary device 36 and is positioned to contact the pivotal member 68 when the auxiliary device is extended from its stored position to its operating position over the working area 26 of the lower terrace 12. When the auxiliary device is moved to its fully extended operating position the tab 72 depresses the plunger 66 to close the safety switch 60 and the circuit to the control switch 37, thereby permitting energization of the auxiliary device. With the auxiliary device 36 located in a position other than the extreme forward position, the plunger 66 remains extended as shown in FIG. 5, and the circuit to the control switch 37 is open at the safety switch. Additionally, the tab 72 contacting pivotal member 70 serves as a stop to prevent the cooking device from being completely removed inadvertently from the range top.

In FIG. 2 the cooking device illustrated comprises an additional surface heating unit 54 and supporting structure 56. It will be appreciated however, that the auxiliary heating unit can take various forms for performing different functions. Thus, the unit may be provided, for example, in the form of an electric grill, a warning compartment, a toaster, or a waffle iron.

Also the auxiliary heating device may, in an alternative embodiment, be supported for pivotal movement into and out of its stored position. Finally, with advanced technology presaging heating units of a substantially planar form, the auxiliary heating unit (or perhaps units) may be stored immediately below the fixed units on the upper level.

I claim as my invention:

1. In a cooking platform arrangement having at least an upper level surface and a lower level surface in front of the upper level surface and intermediate wall means connecting the two surfaces;
   a plurality of heating units including electrical heating elements at fixed locations, at least one of which is located on said lower level surface and at least one of which is located on said upper level surface;
   means defining a storage space below said upper level surface at a location which is spaced apart horizontally from said heating unit on said upper level surface and which is behind said intermediate wall means;
   an auxiliary heating device including an electrical heating element selectively movable from a retracted position in which at least the major portion of said auxiliary heating device is within said storage space to an extended operable position overlying an area of said lower level surface apart from the location of said fixed heating unit on said lower level surface; and
   an electrical circuit connected to said electrical heating elements.

2. In a cooking platform arrangement having at least an upper level surface and a lower level surface in front of the upper level surface and intermediate wall means connecting the two surfaces;
   at least one heating unit including an electrical heating element at a fixed location on said upper level surface;
   means defining a storage space below said upper level surface at a location which is behind said intermediate wall means and which is spaced apart horizontally from the location of any heating units on said lower level surface;
   an auxiliary heating device including an electrical heating element selectively movable from a retracted position in which at least a major portion of said auxiliary heating device is within said storage space to an extended operable position overlying said lower level surface; and
   an electrical circuit connected to said electrical heating elements.

3. In a cooking platform arrangement according to claim 2:
   said platform arrangement includes a pair of said fixed location heating units on said upper level surface in side-by-side spaced apart relation, and a pair of said fixed location heating units on said lower level surface in side-by-side spaced apart relation to provide a free area between said heating units on said lower level surface; and
   said auxiliary heating device and said storage means are disposed in front-to-rear alignment with said free area.

4. In an arrangement according to claim 2:
   means responsive to a retracted position of said auxiliary heating device for preventing its energization in said retracted position.

5. In an arrangement according to claim 2:
   means supporting said auxiliary heating device for front-to-rear sliding movement between said retracted position and said extended position.

6. In an arrangement according to claim 2:
   means limiting movement of said auxiliary heating device beyond said extended operable position.

References Cited

UNITED STATES PATENTS

| | | | |
|---|---|---|---|
| 2,446,063 | 7/1948 | Cameron | 219—445 |
| 2,526,476 | 10/1950 | Ham | 219—444 X |
| 2,551,219 | 5/1951 | Peters et al. | 99—282 |
| 2,584,187 | 2/1952 | Crist | 219—479 X |
| 2,702,848 | 2/1955 | Scofield et al. | 219—444 |
| 2,798,930 | 7/1957 | Frost | 219—444 X |
| 3,122,987 | 3/1964 | Ruhnke | 99—290 |
| 3,218,955 | 11/1965 | Lorang | 99—282 |
| 3,261,279 | 7/1966 | Kaplan et al. | 99—282 |

VOLODYMYR Y. MAYEWSKY, Primary Examiner

U.S. Cl. X.R.

219—445, 478, 479; 99—282